United States Statutory Invention Registration [19]

[11] Reg. Number: H984

Brooks et al. [43] Published: Nov. 5, 1991

[54] SELF-PUMPING IMPURITY CONTROL

[75] Inventors: Jeffrey N. Brooks, Darien; Richard F. Mattas, Downers Grove, both of Ill.

[73] Assignee: The United States of America as represented by the United States Department of Energy, Washington, D.C.

[21] Appl. No.: 324,999

[22] Filed: Mar. 17, 1989

Related U.S. Application Data

[63] Continuation of Ser. No. 564,112, Dec. 21, 1983, abandoned.

[51] Int. Cl.[5] ..... G21B 1/00

[52] U.S. Cl. ..... 376/146; 376/134; 376/136; 376/150; 417/51

[56] References Cited

U.S. PATENT DOCUMENTS

| | | | |
|---|---|---|---|
| 3,117,210 | 1/1964 | Herb | 417/51 |
| 3,377,499 | 4/1968 | Lloyd | 417/51 |
| 3,762,992 | 10/1973 | Hedstrom | 376/150 |
| 4,137,012 | 1/1979 | Porta et al. | 417/51 |
| 4,414,176 | 11/1983 | Krauss et al. | 376/136 |

OTHER PUBLICATIONS

UWFDM-205, 4/77, Avci et al, pp. 1-35.
WFPS-TME-81-011; Preprint, 6/30/81, Taylor et al, "Coating Requirements for an ICF Dry Wall Design", pp. 1-5.
IEEE Transactions on Magnetics, vol. MAG-18, No. 1, Jan. 1982, Powell et al, pp. 197-208.
Fusion Energy Update, Apr. 1982, p. 108, Abs. No. 2228.
J. of Fusion Energy, vol. 1, No. 3, 1981, Burrell, pp. 245-252.
Proc. 7th Symp. on Eng. Problems of Fusion Research, Knoxville, Tenn., Oct. 1977, Bromberg et al, pp. 971-975.
Nuclear Technology, Feb. 1977, vol. 32, No. 2, Chin et al, pp. 115-124.
IEEE Pub. No. 79CH1441-5, 1979, pp. 1634-1637, Brooks et al (III).
J. Nucl. Mater., 103 & 104, 1981, pp. 235-238, Norem et al.
ANL/FPP/TM-174, 5/83, Brooks et al (I), pp. 1-18.
Nucl. Tech./Fusion, 4, Jul. 1983, Brooks (I), pp. 33-45.
Proc. Workshop on Hydrogen Recycling, Oct. 1979, Brooks et al (II), pp. 5.2, 5.3.
Proc. Third Topical Mtg. on the Technology of Controlled Nuclear Fusion, vol. 2, May 1978, pp. 873-882, Brooks (II).

*Primary Examiner*—Harvey E. Behrend
*Attorney, Agent, or Firm*—Robert J. Fisher; Paul A. Gottlieb; William R. Moser

[57] ABSTRACT

Apparatus for removing the helium ash from a fusion reactor having a D-T plasma comprises a helium trapping site within the reactor plasma confinement device, said trapping site being formed of a trapping material having negligible helium solubility and relatively high hydrogen solubility; and means for depositing said trapping material on said site at a rate sufficient to prevent saturation of helium trapping.

4 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SELF-PUMPING IMPURITY CONTROL

CONTRACTUAL ORIGIN OF THE INVENTION

The United States Government has rights in this invention pursuant to Contract No. W-31-109-ENG-38 between the U.S. Department of Energy and the University of Chicago representing Argonne National Laboratory.

This is a continuation of application Ser. No. 564,112, filed Dec. 21, 1983, now abandoned.

BACKGROUND OF THE INVENTION

This invention relates generally to apparatus for removing impurities from the plasma in a fusion reactor, and, more particularly to apparatus for removing the helium ash from a deuterium-tritium plasma.

The most likely fuel for a fusion reactor is deuterium and tritium, which produces alpha particles (helium nuclei) and neutrons. The neutrons produced escape through the walls of the plasma confinement device and are used in generating useful external heat. The alpha particles slow down and collect in the plasma as a helium impurity. Minute amounts of oxygen may also be present as an impurity. Since continuous operation of a fusion reactor requires continuous removal of the fusion by-products and other impurities, the helium ash must be continuously removed from the plasma.

A current method of helium removal involves the limiter, which serves to position the plasma away from the confinement device walls. Typically slots are provided in the limiter. Helium that drifts through the limiter slots is exhausted by a vacuum duct system behind the limiter. Another method involves a divertor, which is usually positioned below the plasma, away from the limiter. A magnetic field is used to divert the escaping alpha particles away from the plasma, where they form helium atoms, which are exhausted by a vacuum duct system. While the vacuum duct system is believed to provide adequate impurity control, it requires extensive structural components which must be fitted to the fusion reactor. Also, since some of the fuel ions would also be swept away in the vacuum system, the tritium must be recycled and a larger inventory of tritium must be available for the reactor.

Therefore, it is an object of the present invention to provide an apparatus for removing impurities from the plasma in a fusion reactor without an external vacuum pumping system.

It is also an object of the present invention to provide an apparatus for removing the helium ash from a fusion reactor.

It is another object of the present invention to provide an apparatus which removes helium ash and minimizes tritium recycling and inventory.

Additional objects, advantages, and novel features of the invention will be set forth in part in the description which follows, and in part will become apparent to those skilled in the art upon examination of the following or may be learned by practice of the invention.

SUMMARY OF THE INVENTION

To achieve the foregoing and other objects and in accordance with the purposes of the present invention, apparatus for removing impurities from a fusion reactor having a hydrogen plasma may comprise: an impurity trapping site within the reactor plasma confinement device, said trapping site being formed of a trapping material having negligible impurity solubility and relatively high hydrogen solubility; and means for depositing said trapping material on said trapping site at a rate sufficient to prevent saturation of impurity trapping. Preferably, the apparatus will remove helium and oxygen.

High energy particles (such as deuterium, tritium and helium) impinging on material surfaces become trapped within the material up to saturation levels which depend on the particle species and energy, the type of material, and the material temperature. Since a fusion reactor uses hydrogen (in the form of deuterium and tritium) as fuel and produces helium as ash, a suitable trapping material must trap helium better than hydrogen. Several materials have been shown to trap helium preferentially over hydrogen: nickel, iron, vanadium, niobium, and tantalum. The selective trapping in certain metals is a result of the negligible solubility of helium compared with the relatively high solubility of hydrogen in the lattice. The impinging helium diffuses through the lattice until it reaches a trapping site where it comes out of solid solution. Hydrogen, on the other hand, remains in solid solution until it diffuses to the surface and escapes. Thus, the trapping material acts as a selective helium pump. However, helium trapping occurs only up to a saturation level, typically $10^{17}-10^{18}/cm^2$, after which it is released at the same rate of impingment. In order to pump helium usefully in a fusion reactor, i.e. to achieve long burn times (approaching six months), the trapping surface must be continuously replated at a rate to prevent saturation of helium trapping.

Although helium is by far the most abundant impurity in a fusion reactor, trace amounts of oxygen may also be present. It has been found that the materials which preferentially trap helium also preferentially trap oxygen.

BRIEF DESCRIPTION OF THE DRAWINGS

The present invention is illustrated in the accompanying drawings wherein.

DETAILED DESCRIPTION OF THE INVENTION

Figure 1:
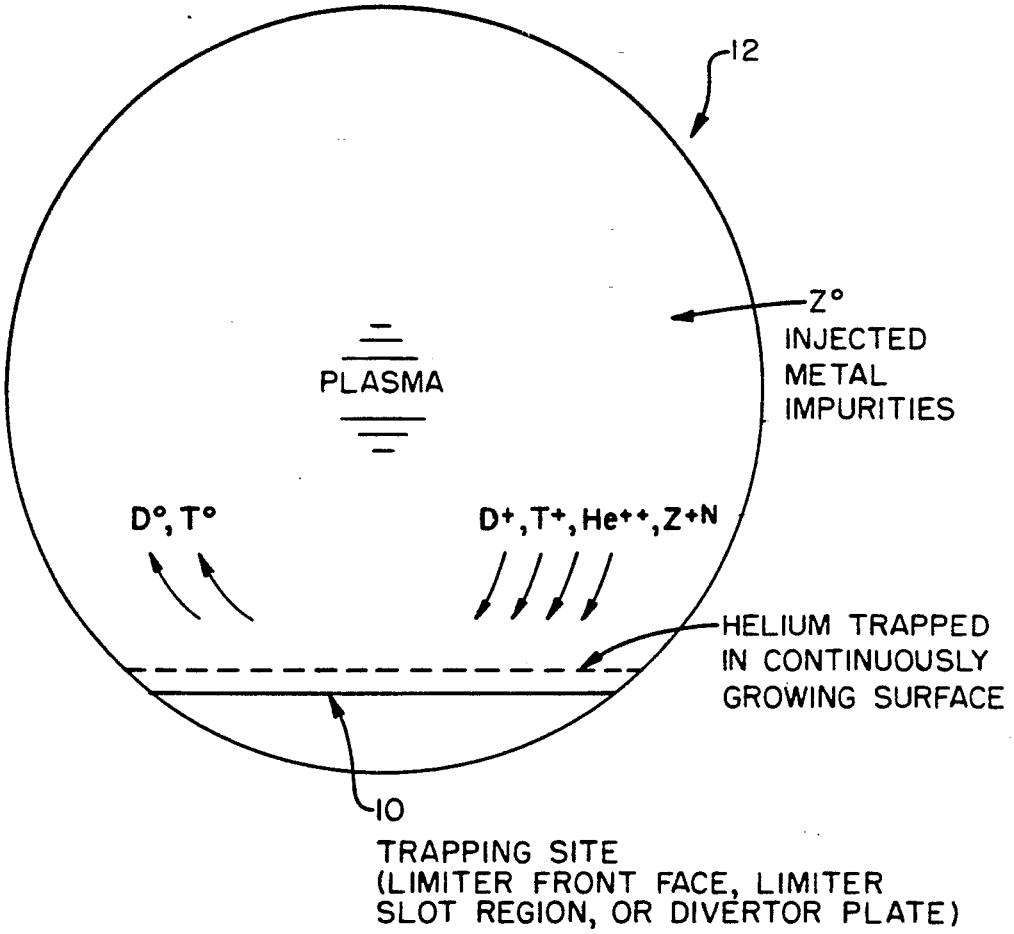
FIG. 1 is a conceptual view of the self-pumping system.

Referring to FIG. 1, trapping site 10, which may be the front face of a limiter, the limiter slot region, or a divertor plate, is positioned within plasma confinement device 12. When deuterium and tritium ions impinge on trapping site 10, they diffuse out as deuterium and tritium atoms. When helium nuclei (alpha particles) impinge on trapping surface 10 they are trapped. The trapping surface is replenished by injecting metal particles ($Z^{\circ}$) into the plasma, which strips them of their electrons forming metal ions. The metal ions then deposit on trapping surface 10, which grows continuously at a rate to prevent helium saturation.

There are several material requirements for selective helium pumping: high hydrogen solubility; high hydrogen diffusivity; absence of hydride formation; high thermal conductivity; adequate operating temperature window; high probability of helium trapping (≧0.25); high saturation trapping level; and self-sputtering coefficient <1. Only a few materials meet these requirements. Low Z materials such as beryllium and carbon tend to trap hydrogen as well as helium. Iron and nickel do not have adequate thermal conductivity to accommodate the high heat fluxes near the plasma. Titanium and zirconium form hydrides at low hydrogen concentrations. The materials which appear to meet the above requirements best are vanadium, niobium, tantalum, tungsten, and molybdenum. Although the first three metals are known to form hydrides, they have high hydrogen solubilities. These metals are also considered high-Z materials and can only be used at low particle energies due to self-sputtering limitations.

TABLE I

Parameters for Self-Pumping System Using a Divertor

| Parameter | Value |
|---|---|
| Concept | Self-pumped divertor |
| Plasma temperature at separatrix, eV | 50 |
| Helium production rate, $s^{-1}$ | $2.2 \times 10^{20}$ |
| Helium trapping rate, $s^{-1}$ | $2.2 \times 10^{20}$ |
| Area of plate, $m^2$ | 32 |
| Metal (vanadium, etc.) current to plate, $s^{-1}$ | $1.1 \times 10^{21}$ |
| Energy of helium ions striking plate (at separatrix), eV | 450 |
| Energy of D-T ions striking plate (at separatrix), eV | 300 |
| Energy of redeposited metal ions striking plate (at separatrix), eV | ≲700 |

At low plasma edge temperature (50 eV at separatrix) a vanadium coated divertor plate (see Table I) would be capable of pumping $2.2 \times 10^{20}$ helium ions per second. Particles entering the slot region of a typical divertor impinge on a neutralizer plate coated with vanadium where a significant fraction of the helium particles are trapped. The escaping D-T particles are allowed to flow out of the divertor and re-enter the plasma scrape-off region. The surface of the neutralizer plate is continuously deposited with incoming metal atoms at a rate that is sufficient to prevent helium saturation. Metal can be added to the plasma, either by pellet injection or by vaporization of metal rods.

The helium saturation trapping fraction in vanadium is of the order of 20%. Therefore $10^{21}$ vanadium atoms per second must be deposited to trap the helium continuously.

Figure 2:
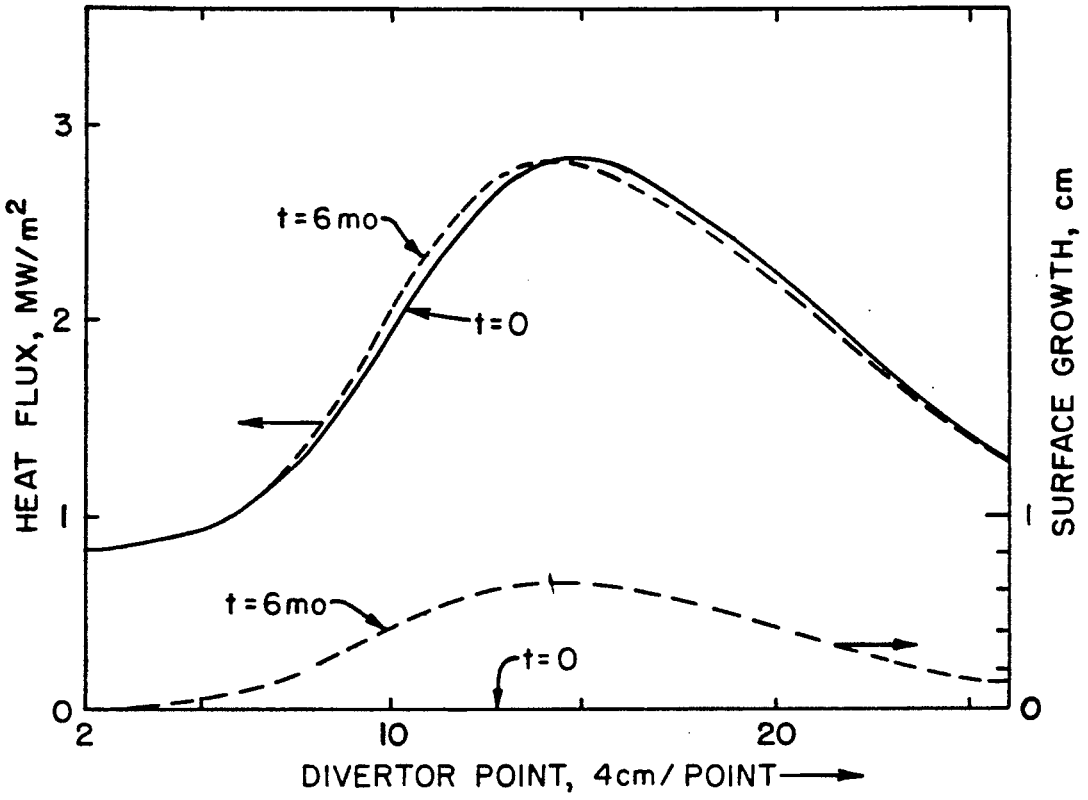
FIG. 2 is a graph of heat flux and surface growth for a self-pumped divertor using a high-Z material such as tungsten.

A REDEP code simulation of a self-pumped divertor surface was performed and the results shown in FIG. 2. Tungsten is believed to be representative of the other high-Z metals and was added at the rate of $10^{21}$ atoms/sec. As shown in FIG. 2 at the end of six months of continuous operation, the surface has grown by a maximum of 0.6 cm. The effect on this growth to the surface heat flux, as shown in FIG. 2, is negligible. The total volume of material used during a 6 month period is 0.25 $m^3$. This is an acceptable amount of trapping material to achieve a lifetime of 6 months continuous burn cycle or one year at 50% burn cycle.

A limiter system would give the same results as the above divertor system at low temperatures. However, at low temperatures the limiter would not need leading edges, only a front face.

TABLE II

Parameters for Self-Pumping System Using Limiter Slot Trapping

| Parameter | Value |
|---|---|
| Concept | Double-edged limiter with two slots |
| Front face material | Beryllium |
| Slot material | Vanadium, etc. |
| Plasma edge temperature, eV | 150 |
| Temperature at slot, eV | 50 |
| Helium production rate, $s^{-1}$ | $2.2 \times 10^{20}$ |
| Helium current to limiter, $s^{-1}$ | $2.2 \times 10^{21}$ |
| Helium entering slots, % | 10 |
| Total neutralizer plate areas, $m^2$ | ~10 |
| Metal (vanadium, etc.) current to plate, $s^{-1}$ | $1.1 \times 10^{21}$ |
| Energy of redeposited metal ions striking plate (maximum), eV | ≲700 |
| Heat flux to plate, $MW/m^2$ | ≲1 |
| Plate operating temperature, °C. | ≳150 |

At higher plasma edge temperatures (150 eV) a limiter slot system may be used (see Table II). A low-Z material is used for the limited front face to minimize erosion from self-sputtering. Vanadium is used for the slot region to trap helium. While most of the vanadium is confined to the slot region, some of the beryllium would be transferred from the front face to the slot region. The average rate of buildup over 10 $m^2$ of neutralizer plate to pump $2 \times 10^{20}$ helium atoms per second is estimated to be $2 \times 10^{-9}$ μm/s or 4.8 cm/yr for continuous operation.

For a system using the limiter front face for trapping, metal injection into the plasma by pellets or puffing is probably the simplest technique. The amount of metal is small compared to the D-T flux and vaporization can be easily achieved in the plasma edge.

For the divertor system or limiter slot system the simplest technique would be to position metal rods or bars of the trapping material in the scrape-off or slot regions to allow the incoming D-T flux to vaporize the metal surface. The vaporized atoms would then be swept into the neutralizer plate with the D-T particle flow. At temperatures greater than 1950° K. a metal rod of vanadium having a surface area of <1 $m^2$ would supply $10^{21}$ atoms/sec. The amount of vaporization can be easily controlled by adjusting the height to which the rods are inserted into the slot region.

Figure 3:
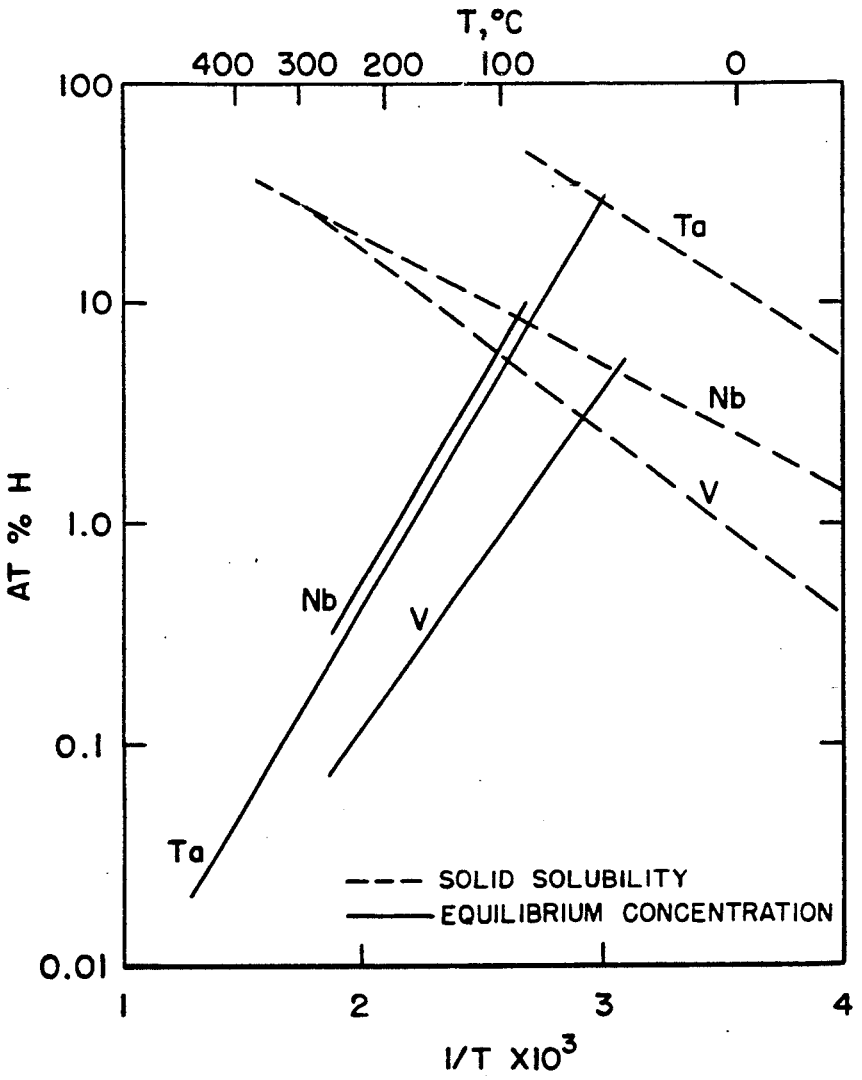
FIG. 3 is a graph of equilibrium hydrogen concentration at 0.13 Pa hydrogen pressure and hydrogen solid solubility in various refractory metals.

An important consideration for vanadium is the possibility of a high retained D-T concentration in the surface layer causing hydride formation. The equilibrium concentration depends upon several factors, including the hydrogen diffusion rate, the hydrogen recombination rate at the surface, and the hydrogen partial pressure in the slot region. The hydrogen concentration in vanadium at 15 Pa ($10^{-3}$ torr) along with the hydrogen solubility are shown in FIG. 3. All values for hydrogen concentration are well below the concentrations needed for hydride formation.

A self-pumping helium removal system has been described. Such a system eliminates all vacuum ducts and pumps (except for a small start-up system). At low temperatures a simple limiter without leading edges could be used or a simplified divertor system.

The embodiments of this invention in which an exclusive property or privilege is claimed are defined as follows:

1. In a magnetic plasma confinement nuclear fusion system having a vessel, a hydrogen plasma within said vessel, said hydrogen plasma containing helium ash impurities, apparatus for removing said helium ash from said plasma, during plasma burn, said apparatus comprising:

(a) a fixed helium trapping site within said magnetic plasma confinement fusion system, said trapping site having a surface of trapping material exposed to the plasma, said trapping material being selected from the group consisting of vanadium, niobium, tantalum, tungsten and molybdenum; and (b) means for injecting particles of said trapping material into said plasma whereby during operation a coating of said trapping material is continuously deposited on said trapping site, at a rate sufficient to prevent saturation of impurity trapping during plasma.

2. In a magnetic plasma confinement nuclear fusion system having a vessel, a hydrogen plasma within said vessel, said hydrogen plasma containing helium and oxygen impurities, apparatus for removing said impurities from said plasma during plasma burn, said apparatus comprising:

(a) a fixed impurity trapping site within said magnetic plasma confinement fusion system, said trapping site having a surface of trapping material exposed to the plasma, said trapping material being selected from the group consisting of vanadium, niobium, tantalum, tungsten and molybdenum; and (b) means for injecting particles of said trapping material into said plasma whereby during operation a coating of said trapping material is continuously deposited on said trapping site, at a rate sufficient to prevent saturation of impurity trapping during plasma.

3. The apparatus of claim 1 wherein said trapping material is vanadium and said deposition rate is about $10^{21}$ atoms/sec.

4. The apparatus of claim 2 wherein said trapping material is vanadium and said deposition rate is about $10^{21}$ atoms/sec.

* * * * *